United States Patent
Wood

(10) Patent No.: US 10,659,382 B2
(45) Date of Patent: *May 19, 2020

(54) VEHICLE SECURITY SYSTEM

(71) Applicant: UATC, LLC, San Francisco, CA (US)

(72) Inventor: Matthew Shaw Wood, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/363,366

(22) Filed: Mar. 25, 2019

(65) Prior Publication Data

US 2019/0222530 A1    Jul. 18, 2019

Related U.S. Application Data

(63) Continuation of application No. 15/337,383, filed on Oct. 28, 2016, now Pat. No. 10,243,867.

(51) Int. Cl.
| | | |
|---|---|---|
| *H04L 12/863* | (2013.01) | |
| *H04W 4/02* | (2018.01) | |
| *H04W 4/40* | (2018.01) | |

(52) U.S. Cl.
CPC ............. *H04L 47/50* (2013.01); *H04W 4/023* (2013.01); *H04W 4/40* (2018.02)

(58) Field of Classification Search
CPC .......... H04L 47/50; H04W 4/40; H04W 4/023
USPC ....................................................... 709/205
See application file for complete search history.

(56) References Cited

U.S. PATENT DOCUMENTS

| | | | | |
|---|---|---|---|---|
| 2005/0021457 A1* | 1/2005 | Johnson | ................. | G06Q 20/04 705/39 |
| 2007/0251988 A1* | 11/2007 | Ahsan | .................... | G06Q 10/06 235/375 |
| 2009/0112394 A1 | 4/2009 | Lepejian et al. | | |
| 2010/0280700 A1 | 11/2010 | Morgal et al. | | |

(Continued)

FOREIGN PATENT DOCUMENTS

WO    WO-2017079222 A1  *  5/2017  ............. G06Q 50/30

OTHER PUBLICATIONS

Gary Alt, How to dispute retnal car damage claims, Mar. 20, 2015, www.csmonitor.com, https://www.csmonitor.com/Business/Saving-Money/2015/0320/How-to-dispute-and-win-rental-car-damage-claims (Year: 2015).*

*Primary Examiner* — Zi Ye
(74) *Attorney, Agent, or Firm* — Dority & Manning, P.A.

(57) ABSTRACT

Systems and methods for addressing a vehicle condition are provided. In one example embodiment, a method includes receiving data indicative of a condition associated with an autonomous vehicle. The autonomous vehicle is associated with a service provider that provides a service to a plurality of users of the service. The method includes identifying at least a subset of the plurality of users of the service based, at least in part, on a respective location associated with each user of the subset of users and a location of the vehicle. The method includes determining a selected user from the subset of users to address the condition associated with the vehicle based at least in part on one or more parameters. The method includes providing, to the selected user, a communication. The communication including a request that the selected user address the condition associated with the vehicle.

19 Claims, 6 Drawing Sheets

(56) References Cited

U.S. PATENT DOCUMENTS

| | | | | |
|---|---|---|---|---|
| 2010/0280854 A1* | 11/2010 | Huang | ................... | B60R 25/00 |
| | | | | 705/5 |
| 2014/0306826 A1* | 10/2014 | Ricci | ...................... | H04W 4/21 |
| | | | | 340/573.1 |
| 2015/0185034 A1* | 7/2015 | Abhyanker | ............ | G01C 21/36 |
| | | | | 701/23 |
| 2017/0043788 A1* | 2/2017 | Cullinane | ............. | B60W 30/00 |

\* cited by examiner

300

| (1) | REQUEST A ← 202A |
|---|---|
| (2) | REQUEST B ← 202B |
| (3) | REQUEST C ← 202C |
| (4) | REQUEST D ← 202D |
| (5) | REQUEST E ← 202E |
| ... | ... |

*FIG. 3A*

| (1) | REQUEST E ← 202E |
|---|---|
| (2) | REQUEST A ← 202A |
| (3) | REQUEST B ← 202B |
| (4) | REQUEST C ← 202C |
| (5) | REQUEST D ← 202D |
| ... | ... |

*FIG. 3B*

VEHICLE SECURITY SYSTEM

PRIORITY CLAIM

The present application is a continuation of U.S. application Ser. No. 15/337,383 having a filing date of Oct. 28, 2016. Applicants claim priority to and benefit of all such applications and incorporate all such applications herein by reference.

FIELD

The present disclosure relates generally to resolving adverse conditions of an autonomous vehicle.

BACKGROUND

An autonomous vehicle can perceive its surroundings by using various sensor apparatuses and determine its position on the basis of the information associated with its surroundings. This can allow an autonomous vehicle to navigate with minimal or no human intervention and, in some cases, even omit the use of a human driver altogether. However, the lack of in-person human oversight can potentially reduce the vehicle's security. For instance, a person is unavailable to immediately address problems with the vehicle that may decrease vehicle security and subject the vehicle to potential theft or damage. One potential approach is to deploy a maintenance crew to the vehicle. However, the coordination of such deployment can be complex, time-consuming, and cost prohibitive.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of addressing a vehicle condition. The method includes receiving, by one or more computing devices, data indicative of a condition associated with an autonomous vehicle. The autonomous vehicle is associated with a service provider that provides a service to a plurality of users of the service. The method includes identifying, by the one or more computing devices, at least a subset of the plurality of users of the service based at least in part on a respective location associated with each user of the subset of users and a location of the vehicle. The method includes determining, by the one or more computing devices, a selected user from the subset of users to address the condition associated with the vehicle based at least in part on one or more parameters. The method includes providing, to the selected user by the one or more computing devices, a communication. The communication includes a request that the selected user address the condition associated with the vehicle.

Another example aspect of the present disclosure is directed to a system for addressing a vehicle condition. The system includes one or more processors and one or more memory devices. The one or more memory devices store instructions that when executed by the one or more processors cause the one or more processors to perform operations. The operations include receiving, from a computing device associated with an autonomous vehicle, data indicative of a condition associated with the vehicle. The vehicle is associated with a service provider that provides a service. The operations include determining a user of the service to address the condition associated with the vehicle based at least in part on the location of the user. The operations include providing, to the user, a communication indicative of a request that the user address the condition associated with the vehicle.

Yet another example aspect of the present disclosure is directed to one or more tangible, non-transitory computer-readable media storing computer-readable instructions that when executed by one or more processors cause the one or more processors to perform operations. The operations include receiving data indicative of a condition associated with an autonomous vehicle, wherein the vehicle is associated with a service provider that provides a service to a plurality of users. The operations include identifying one or more of the users of the service to potentially address the condition associated with the vehicle. The operations include determining a selected user of the one or more users of the service to address the condition associated with the vehicle based at least in part on or more parameters. The operations include providing, to a user device of the selected user, a communication indicative of a request that the selected user address the condition associated with the vehicle.

Other example aspects of the present disclosure are directed to systems, methods, apparatuses, tangible, non-transitory computer-readable media, user interfaces, memory devices, and vehicles for addressing a vehicle condition.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIGS. 3A-B depict an example service queue according to example embodiments of the present disclosure;

DETAILED DESCRIPTION

Figure 1:
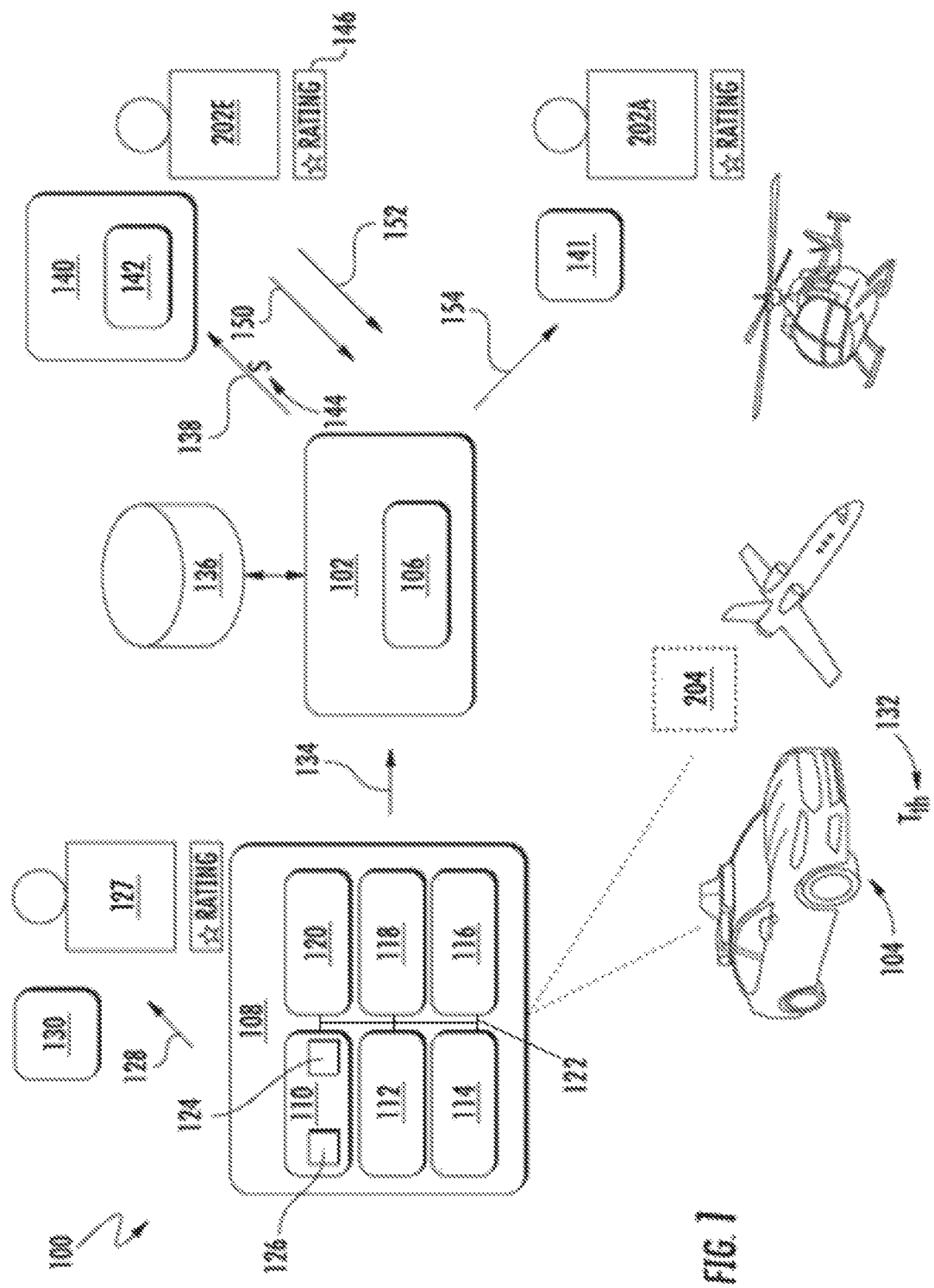
FIG. 1 depicts an example system for addressing a vehicle condition according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to resolving adverse conditions of an autonomous vehicle to increase vehicle security. For instance, a service provider can use a fleet of vehicles to provide a service to a plurality of users. The fleet can include, for example, autonomous vehicles that can drive, navigate, operate, etc. with minimal and/or no interaction from a human driver, as further described herein. The autonomous vehicles can provide the services of the service provider. The services can include, for example, transportation services (e.g., rideshare services), courier services, delivery services, etc. A user of the service can be a user that has downloaded a software application associated with the service provider, a user that has made a service request with the service provider, a user that is a customer of the service provider, a user that has registered with (e.g., signed-up with, has an account with, has a profile with, has subscribed to) the service provider, etc. A central operations system (e.g., a cloud-based server system) can allow the service provider to monitor the fleet of vehicles to determine information about each vehicle, such as the vehicle's location, the vehicle's availability, and/or the conditions of the vehicle. In the event that the operations system detects a condition associated with the vehicle (e.g., that reduces vehicle safety), the operations system can request that a user of the service address the particular condition. Such conditions can include, for example, an open passenger door, an open trunk door, a malfunctioning door that cannot be opened from the inside of the vehicle, etc.

By way of example, a rider of an autonomous vehicle (transporting the rider) may leave a door of the vehicle open upon exiting and/or leaving the vehicle. Since the autonomous vehicle may not have a driver to address this condition, the operations system can identify one or more user(s) of the service that may be available to close the door. This can include, for example, users that are near the vehicle and that have made a transportation request. The operations system can select a user to close the door based, at least in part, on the user's proximity to the vehicle and/or other parameters. The operations system can send a communication to the selected user (e.g., a text message to the user's mobile phone) requesting that the selected user close the door of the vehicle, which can then be used for the user's transportation request. To encourage the user's cooperation, the operations system can provide an incentive to the user, such as a monetary discount for the transportation services. In this way, the systems and methods of the present disclosure can address a condition associated with a vehicle and/or reduce potential risk to the vehicle, without deploying a maintenance team to the vehicle's location.

More particularly, a service provider can use a fleet of vehicles (e.g., ground-based vehicles, aircrafts) to provide a service such as a transportation service, a courier service, a delivery service, etc. The fleet can include autonomous vehicles, as described herein. To monitor the fleet of vehicles, the service provider can utilize an operations computing system that is configured to communicate with the computing devices of the vehicle and/or the users (e.g., user devices). For instance, the operations computing system can determine when a vehicle is currently being used for the transportation, courier, delivery services, etc. In some implementations, the operations computing system can monitor the interactions between a current user and the vehicle and provide a proactive notification to the current user to avoid an adverse condition. For example, the operations computing system can detect that the current user (e.g., current rider) has placed an item in the vehicle's trunk. Accordingly, the operations computing system can provide a reminder to the current user to close the trunk after removing the item and leaving the vehicle at the destination location. However, the current user may forget to do so and may leave the trunk door of the vehicle in an open position.

The operations computing system can determine when the vehicle is experiencing a potentially adverse condition. For instance, the vehicle's computing system can be used to detect whether a condition exists and inform the operations computing system of the condition. By way of example, one or more of the vehicle's on-board sensor(s) and/or camera(s) can be used to detect that the trunk door has been left open, thus exposing the vehicle to a higher risk of theft, damage, etc. The vehicle (e.g., via its computing devices) can send data indicative of the open trunk door to the operations computing system, alerting the operations system of the condition.

The operations computing system can receive the data indicative of the vehicle condition. The operations computing system can identify one or more user(s) to potentially address the condition associated with the vehicle using a variety of criteria. In some implementations, the operations computing system can obtain location data indicative of the respective locations of the users of the service. The operations computing system can identify which user(s) are within proximity (e.g., a threshold distance) of the vehicle and can select at least one of the identified user(s) to address the condition associated with the vehicle (e.g., to close the open trunk door). When selecting the user, the operations computing system can adjust a service queue associated with the vehicle such that the selected user's service request can be prioritized with respect to the vehicle, as will be further described.

A user can be selected based, at least in part, on parameters that help increase the likelihood that the user will alleviate the vehicle condition. For example, the operations computing system can select a user based, at least in part, on the user's location. A user that is located closer to the vehicle may be more willing to address the condition (and/or use the vehicle for its services). Additionally, or alternatively, the operations computing system can select a user based, at least in part, on the vehicle's position (e.g., location, orientation, heading). In this way, the operations computing system can increase user convenience (and likelihood of cooperation) by pairing a user to a vehicle that is already oriented to travel in the direction of the user's desired destination. Moreover, the operations computing system can consider the ratings of the identified user(s). For example, the operations computing system can examine ratings that indicate the behavior of the user while using the service vehicles. This can allow the operations computing system to select a user with a higher behavioral rating, which may be indicative of a higher likelihood that the user will address the condition associated with the vehicle (e.g., the open trunk door). In some implementations, the operations computing system can select more than one user to address the vehicle condition to help further increase the likelihood that the condition will be remedied.

The operations computing system can provide a communication, to the selected user(s), which requests the selected user(s) to address the condition associated with the vehicle. The communication can be provided to a user device associated with the respective user (e.g., via a software application associated with the service provider). For example, the communication can be provided to a user's mobile phone and can request that the user walk to the vehicle and close the vehicle trunk door. In some implementations, the user can then use the vehicle for the user's service request (e.g., to transport the user, to transport an item). To encourage the user to meet the request, the communication can include an incentive such as, for example, a monetary discount associated with the service. Moreover, the operations computing system can apply a penalty (e.g., reduced user rating, monetary penalty) to the recent user that left open the door of the vehicle. In some implementations, the recent user of the vehicle can be selected as the user to address the condition of the vehicle. As further described herein, the recent user can be identified as being able to potentially address the condition of the vehicle based, at least in part, on an imaging system (e.g., LIDAR) associated with the vehicle that can determine the recent user's proximity to the vehicle. In the event that the recent user is selected, a communication can be provided to the recent user via an audio output device (e.g., horn, speaker) and/or a visual output device (e.g., lights) of the vehicle.

The selected user(s) can confirm or deny the request to address the condition associated with the vehicle. In the event that a user confirms the request, the operations computing system can pair the user with the vehicle and provide the user with the incentive. The user can walk to the vehicle, alleviate the condition (e.g., by closing the door) and, if requested, can use the vehicle for its service (e.g., to transport the user). In the event that the user denies the request, the operations computing system can select a different user and request that the different user address the condition associated with the vehicle (e.g., close the open trunk door).

The systems and methods described herein may provide a number of technical effects and benefits. For instance, by using its network of service users to address vehicle conditions, the operations computing systems can save valuable resources that would otherwise be used for coordinating and deploying maintenance/servicing teams to the vehicles. More particularly, by reducing the need for maintenance team deployment, the systems and methods can limit the allocation of processing and storage resources that are required for such deployment. The saved resources can be allocated to other functions of the operations computing systems, such as the processing of service requests, generating user interfaces, vehicle routing, etc. In this way, the systems and methods according to example aspects of the present disclosure have a technical effect of providing a computationally efficient approach to addressing vehicle problems while saving computational resources for other, more core functions.

The systems and methods of the present disclosure also provide an improvement to vehicle computing technology, such as autonomous vehicle computing technology. For instance, the methods and systems enable the vehicle technology to resolve security problems associated with the autonomous vehicles without adding more complex, expensive security hardware. For example, the systems and methods can receive data indicative of a condition associated with an autonomous vehicle, identify at least a subset of the plurality of users of the service, determine a selected user of at least the subset of users of the service to address the condition associated with the vehicle based at least in part on one or more parameters, and provide, to the selected user a communication including a request that the selected user address the condition associated with the vehicle. This can allow the vehicle computing systems to increase the security of the vehicle computing systems by leveraging the capability of the operations computing system. Moreover, the vehicle can save computational resources that may otherwise be used for the coordination of other vehicle security measures. Accordingly, the saved processing and storage resources of the vehicle can be consumed for more critical, core functions of the vehicle such as imaging, object detection, autonomous navigation, etc.

With reference now to the FIGS., example embodiments of the present disclosure will be discussed in further detail. FIG. 1 depicts an example system 100 according to example embodiments of the present disclosure. The system 100 can include an operations computing system 102 and a vehicle 104.

The operations computing system 102 can be associated with a service provider that provides a service to a plurality of users via a fleet of vehicles that includes the vehicle 104. As indicated above, the service can include at least one of a transportation service, a courier service, a delivery service, and another type of service. The operations computing system 102 can include various components for performing various operations and functions. For example, the operations computing system 102 can include one or more computing device(s) 106 that include one or more processor(s) and one or more memory device(s). The one or more memory device(s) can store instructions that when executed by the one or more processor(s) cause the one or more processor(s) to perform the operations and functions, such as those described herein for addressing a vehicle condition. For example, the computing device(s) 106 can be configured to monitor and communicate with the vehicle 104 (e.g., of the service provider) and/or its users to address a condition 204 associated with the vehicle 104 (e.g., an open door).

The computing device(s) 106 can communicate with the vehicle 104 via one or more communication network(s). The communication network(s) can include various wired and/or wireless communication mechanisms (e.g., cellular, wireless, satellite, microwave, and radio frequency) and/or any desired network topology (or topologies). For example, the network(s) can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 104.

The vehicle 104 can be an automobile, an aircraft, and/or another type of vehicle. The vehicle 104 can be an autonomous vehicle that can drive, navigate, operate, etc. with minimal and/or no interaction from a human driver. The autonomous vehicle 104 can be configured to operate in one or more mode(s) such as, for example, a fully autonomous operational mode, a semi-autonomous operational mode, a park mode, a sleep mode, etc. A fully autonomous (e.g., self-driving) operational mode can be one in which the autonomous vehicle 104 can provide driving and navigational operation with minimal and/or no interaction from a human driver present in the vehicle. A semi-autonomous operational mode can be one in which the autonomous vehicle 104 can operate with some interaction from a human driver present in the vehicle. Park and/or sleep modes can be used between operational modes while an autonomous vehicle 104 waits to provide a subsequent service, recharges between operational modes, etc.

The vehicle 104 can include a vehicle computing system 108. The vehicle computing system 108 can include various components for performing various operations and functions. For example, the vehicle computing system 108 can include one or more computing device(s) on-board the vehicle 104. The vehicle computing system 108 can include one or more processor(s) and one or more memory device(s), each of which can be on-board the vehicle 104. The one or more memory device(s) can store instructions that when executed by the one or more processor(s) cause the one or more processor(s) to perform the operations and functions of the vehicle 104, as described herein.

The vehicle computing system 108 can include and/or communicate with various other systems associated with the vehicle 104. For instance, the vehicle 104 can include one or more data acquisition system(s) 110, an autonomy system 112, one or more control system(s) 114, one or more output device(s) 116, one or more human machine interface system(s) 118, a communications system 120, and/or other vehicle systems. The other vehicle systems can be configured to control and/or monitor various other aspects of the vehicle 104. Such other vehicle systems can include, for example, an on-board diagnostics systems, engine control unit, transmission control unit, memory devices, etc.

The systems of the vehicle 104 can be configured to communicate via a network 122. The network 122 can include one or more data bus(es) (e.g., controller area network (CAN)), an on-board diagnostics connector (e.g., OBD-II), and/or a combination of wired and/or wireless communication links. The systems can send and/or receive data, messages, signals, etc. amongst one another via the network 122.

The data acquisition system(s) 110 can include various devices configured to acquire data associated with the vehicle 104. This can include data associated with one or more of the vehicle's systems (e.g., health data), the vehicle's interior, the vehicle's exterior, the vehicle's surroundings, the vehicle users, etc. The data acquisition system(s) 110 can include, for example, one or more image capture device(s) 124. The image capture device(s) 124 can include one or more camera(s), light detection and ranging (or radar) device(s) (LIDAR systems), two-dimensional image capture devices, three-dimensional image capture devices, static image capture devices, dynamic (e.g., rotating, revolving) image capture devices, video capture devices (e.g., video recorders), lane detectors, scanners, optical readers, electric eyes, and/or other suitable types of image capture devices. The image capture device(s) 124 can be located in the interior and/or on the exterior of the vehicle 104. The image capture device(s) 124 can be configured to acquire image data to allow the vehicle 104 to implement one or more machine vision techniques (e.g., to detect objects in the surrounding environment). For example, the image capture device(s) 124 can be used to help detect nearby vehicles, bicycles, pedestrians, buildings, signage, etc. during operation of the vehicle 104.

The data acquisition systems 110 can include one or more sensor(s) 126. The sensor(s) 126 can include motion sensors, pressure sensors, temperature sensors, humidity sensors, RADAR, sonar, radios, medium-range and long-range sensors (e.g., for obtaining information associated with the vehicle's surroundings), global positioning system (GPS) equipment, proximity sensors, and/or any other types of sensors for obtaining data associated with the vehicle 104 and/or relevant to the operation of the vehicle 104 (e.g., in an autonomous mode). The data acquired by the sensor(s) 126 can help detect other vehicles and/or objects, road conditions (e.g., curves, potholes, dips, bumps, changes in grade), measure a distance between the vehicle 104 and other vehicles and/or objects, etc. The sensor(s) 126 can include sensor(s) associated with one or more mechanical and/or electrical components of the vehicle. For example, one or more of the sensor(s) 126 can be configured to detect whether a vehicle door, trunk, gas cap, etc. is in an open or closed position.

The vehicle computing system 108 can also be configured to obtain map data. For instance, a computing device of the vehicle 104 (e.g., within the autonomy system 112) can be configured to receive map data from one or more remote computing system(s) (e.g., associated with a geographic mapping service provider) and/or local memory device(s). The map data can include two-dimensional and/or three-dimensional geographic map data associated with the area in which the vehicle 104 was, is, and/or will be travelling.

The autonomy system 112 can be configured to allow the vehicle 104 to operate in an autonomous mode (e.g., fully autonomous mode, semi-autonomous mode). For instance, the autonomy system 112 can obtain the data associated with the vehicle 104 (e.g., acquired by the data acquisition system(s) 110). The autonomy system 112 can also obtain the map data. The autonomy system 112 can control various functions of the vehicle 104 based, at least in part, on the data acquired by the data acquisition system(s) 110 and/or the map data to implement an autonomous mode. For example, the autonomy system 112 can include various models to perceive elements (e.g., road features, signage, objects, people, other animals) based, at least in part, on the acquired data and/or map data. In some implementations, the autonomy system 112 can include machine-learned models that use the data acquired by the data acquisition system(s) 110 and/or the map data to help operate the vehicle.

The data acquired by the data acquisition system(s) 110 and/or the map data can be used within the various models to, for example, detect other vehicles and/or objects, detect road conditions (e.g., curves, potholes, dips, bumps, changes in grade), measure a distance between the vehicle 104 and other vehicles and/or objects, etc. The autonomy system 112 can be configured to predict the position and/or movement (or lack thereof) of such elements (e.g., using one or more odometry techniques). The autonomy system 112 can be configured to plan the motion of the vehicle 104 based, at least in part, on such predictions. The autonomy system 112 can include a navigation system and can be configured to implement the planned motion to appropriately navigate the vehicle 104 with minimal and/or no human-driver intervention. For example, the autonomy system can regulate vehicle speed, acceleration, deceleration, steering, and/or the operation of components to follow the planned motion. In this way, the autonomy system 112 can allow an autonomous vehicle 104 to operate in a fully and/or semi-autonomous mode.

The one or more control system(s) 114 of the vehicle 104 can be configured to control one or more aspect(s) of the vehicle 104. For example, the control system(s) 114 can be configured to control one or more access point(s) of the vehicle 104. The access point(s) can include features such as the vehicle's door locks, trunk lock, hood lock, fuel tank access, latches, and/or other mechanical access features that can be adjusted between one or more state(s), position(s), location(s), etc. For example, the control system(s) 114 can be configured to control an access point (e.g., door lock) to adjust the access point between a first state (e.g., lock position) and a second state (e.g., unlocked position).

The control system(s) 114 can be configured to control one or more other feature(s) of the vehicle 104 that can be adjusted between one or more state(s). For example, the control system(s) 114 can be configured to control one or more electrical feature(s) (e.g., AC system, interior lights, sound system, microphone) to adjust the feature between a first state (e.g., off, low) and a second state (e.g., on, high). By way of example, the control system(s) 114 can be configured to control one or more output device(s) 116 of the vehicle 104. The output device(s) 116 can include one or more audio output device(s) (e.g., speaker), one or more visual output device(s) (e.g., lights, display devices), and/or other sensory output device(s) (e.g., vibrating mechanism). The output device(s) 116 can be located in the interior and/or on the exterior of the vehicle 104.

In some implementations, to control the access point(s) and/or other feature(s) (e.g., output device(s) 116), the control system(s) 114 can send one or more signal(s) that define a state for the access point(s) and/or other feature(s). The access point(s) and/or other feature(s) can receive such signals and adjust according to the state defined in the signals. For example, the control system(s) 114 can send a control command signal to one or more exterior light(s) of the vehicle 104 to change from an "off" state (e.g., no light emission) to an "on" and/or "flashing" state (e.g., continuous light emission, semi-continuous light emission).

The human machine interface system(s) 118 can be configured to allow interaction between a user (e.g., human) and the vehicle 104 (e.g., the vehicle computing system 108). The human machine interface system(s) 118 can include a variety of interfaces for the user to input and/or receive information from the vehicle computing system 108. For example, the human machine interface system(s) 118 can include a graphic user interface, direct manipulation interface, web-based user interface, touch user interface, attentive user interface, conversational and/or voice interfaces (e.g., via text messages, chatter robot), conversational interface agent, interactive voice response (IVR) system, gesture interface, holographic user interface, intelligent user interface (e.g., acting on models of the user), motion tracking interface, non-command user interface, OOUI, reflexive user interface, search interface, tangible user interface, task focused interface, text based interface, natural language interface, command line interface, zero-input interface, zooming user interface, and/or other types of interfaces. In some implementations, the human machine interface system(s) 118 can be implemented using the one or more output device(s) 116 (e.g., display devices, speakers, lights) to output data associated with the interfaces. The human machine interface system(s) 118 can include one or more input device(s) (e.g., touchscreens, keypad, touchpad, knobs, buttons, sliders, switches, mouse, gyroscope, microphone, other hardware interfaces) configured to allow the user to provide input.

The communications system 120 can be configured to allow the vehicle systems to communicate with other computing devices. The vehicle computing system 108 can use the communications system 120 to communicate with the operations computing system 102 over a network (e.g., via one or more wireless signal connections). In some implementations, the vehicle computing system 108 can use the communications system 120 to communicate with one or more user device(s). In some implementations, the communications system 120 can be configured to allow the vehicle computing system 108 to communicate with one or more on-board systems of the vehicle 104. The communications system 120 can include any suitable components for interfacing with one or more network(s), including for example, transmitters, receivers, ports, controllers, antennas, or other suitable components that can help facilitate communication with one or more other computing device(s) (e.g., computing device(s) 106).

The autonomous vehicle 104 can be associated with a service provider. For example, the service provider associated with the operations computing system 102 can coordinate the autonomous vehicle 104 to provide a service to a plurality of users. As indicated above, the service can be at least one of a transportation service, a courier service, a delivery service, and another type of service. Before, during, and/or after the service is provided to a user, the user may cause a condition 204 associated with the vehicle 104 that increases the risk of damage, theft, exploitation, etc. of the vehicle 104.

In some implementations, the computing device(s) 106 of the operations computing system 102 and/or the vehicle computing system 108 can proactively warn a user to avoid such a condition 204. For example, the computing device(s) 106 and/or the vehicle computing system 108 can monitor the interactions between a user 127 (e.g., a current user) and the vehicle 104. This can be done via the vehicle's cameras and/or sensors. The computing device(s) 106 and/or the vehicle computing system 108 can provide a notification 128 to a current user 127 of the vehicle 104 instructing the current user 127 to avoid a condition 204 associated with the vehicle 104. The notification 128 can be based, at least in part, on a past and/or present interaction of the current user 127 with the vehicle 104. For example, the computing device(s) 106 and/or the vehicle computing system 108 can detect that the current user 127 (e.g., current rider) has placed an item in the vehicle's trunk. Accordingly, a notification 128 can be provided to the current user 127 reminding the user to close the trunk after removing the item and leaving the vehicle 104 at the user's destination location. In some implementations, the computing device(s) 106 can provide the notification 128 (e.g., via a text message) to a user device 130 associated with the user 127. Additionally, or alternatively, the computing device(s) 106 can provide data indicative of the notification 128 to the vehicle computing system 108 such that the vehicle computing system 108 can audibly, visually, and/or haptically communicate the notification 128 to the user (e.g., via an output device 116). In some implementations, the vehicle computing system 108 can provide the notification 128 to the user 127 without communicating with the operations computing system 108. Despite the notification 128, the current user 127 may still leave the trunk door of the vehicle 104 in an open position after arriving at the destination location, thus, causing a condition 204 associated with the vehicle 104.

The vehicle computing system 108 can detect a condition 204 associated with the vehicle 104. For instance, one or more of the data acquisition system(s) 110 can detect a condition 204 associated with the vehicle 104. By way of example, the sensor(s) 126 (e.g., associated with a vehicle door) can detect the condition 204 associated with the vehicle 104 (e.g., an open door). The sensor(s) 126 can classify the condition 204 in a binary manner (e.g., "0"—the door is not open, "1"—the door is open).

Additionally, or alternatively, one or more of the image capture device(s) 124 can be configured to detect the condition 204 associated with the vehicle 104. For example, the interior (and/or exterior) cameras of the vehicle 104 can acquire image data indicating a condition 204 associated with the vehicle 104. This can include the open vehicle door, a malfunctioned door that does not open, a user that has not exited the vehicle 104 (e.g., that has fallen asleep), etc. The vehicle computing system 108, computing device(s) 106, and/or a human observer associated with the service provider can analyze the image data to determine the existence of the condition 204 associated with the vehicle 104 (e.g., the open door).

In some implementations, the condition 204 associated with the vehicle 104 can be associated with a time threshold 132. The vehicle computing system 108 can be configured to determine that a condition 204 associated with the vehicle 104 exists, when the condition 204 has occurred for a time period that is equal to or exceeds the time threshold 132. In some implementations, the time threshold 132 can be based, at least in part, on a time from when the vehicle 104 is released from its current service. This can occur, for instance, when the user 127 actively releases the vehicle from its service (e.g., via a user interface on a user device) and/or exits the vehicle 104 and travels a certain distance away from the vehicle 104. For example, the vehicle computing system 108 can determine that a vehicle door has been left open by a recent user when the door has been open for a time period (e.g., after the user releases the vehicle from its transportation service) that exceeds the time threshold 132. In some implementations, the time threshold 132 can be based, at least in part, on a time from when the vehicle 104 arrives at a destination. For example, the vehicle computing system 108 can determine that a condition 204 exists because a vehicle door has not been opened for a time period (e.g., after the vehicle has arrived at a destination) that exceeds the time threshold 132. As such, use of the time threshold 132 can help avoid prematurely detecting a condition 204 associated with the vehicle 104.

The computing device(s) 106 of the operations computing system 102 can receive data indicative of a condition 204 associated with an autonomous vehicle 104 from a computing device associated with the autonomous vehicle 104. For instance, the vehicle computing system 108 can send data 134 indicative of a detected condition 204 to the computing device(s) 106. The computing device(s) 106 can receive the data 134 from the vehicle computing system 108. Because the autonomous vehicle 104 may not include a driver to alleviate the condition 204 (e.g., to close the door, to wake-up a sleeping passenger), the computing device(s) 106 can find one or more user(s) (e.g., of service provider's services) to address the vehicle condition 204.

To help do so, the computing device(s) 106 can be configured to obtain location data 136 associated with the one or more user(s) of the service. For example, a user device associated with a user of the service can be configured to periodically provide one or more raw location report(s) to the operations computing system 102 (and/or one or more associated computing device(s)) of the service provider.

Figure 2:
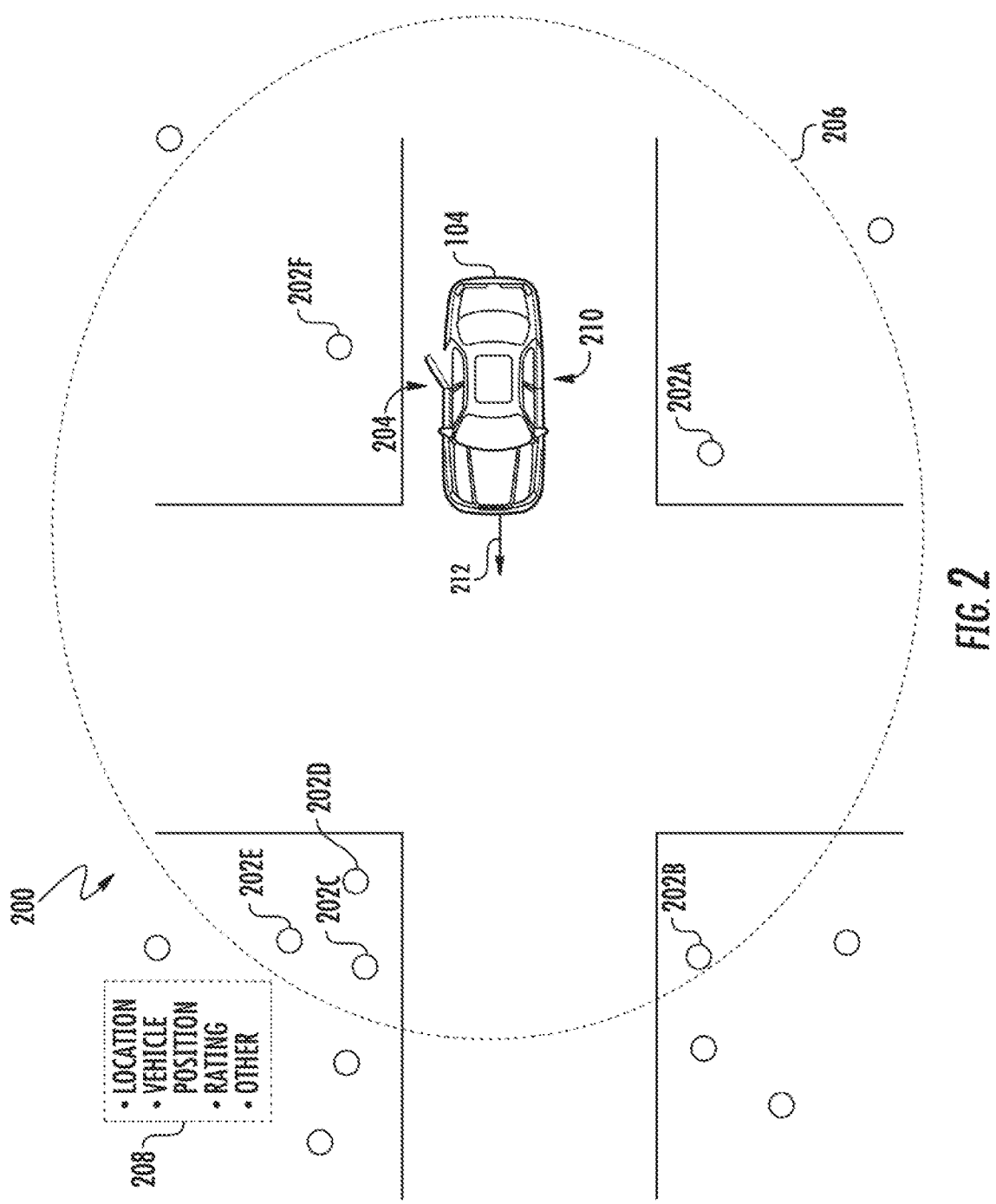
FIG. 2 depicts an example graphical representation of a plurality of users of a service according to example embodiments of the present disclosure.

FIG. 2 depicts an example graphical representation of a plurality of users 200 of the service according to example embodiments of the present disclosure. In particular, the graphical representation depicts locations of the plurality of users 200 using circular markers that respectively correspond to a plurality of locations respectively provided by a plurality of location reports. Thus, each marker can correspond to a location at which a device associated with a user of the service is thought to have been located at a particular time. Each of the plurality of location reports can include at least a set of data indicative of an associated location and time. The user devices can provide the location reports to the service provider (e.g., via one or more communication network(s)) when permission is given by the user, a software application associated with the service provider is running on the user device, after the user has submitted a service request (e.g., to hail a vehicle for transportation services, courier, delivery, other services).

The computing device(s) 106 of the operations computing system 102 can be configured to identify one or more of the user(s) 202A-F of the service to potentially address a condition 204 associated with the vehicle 104. As shown in FIG. 2, the condition 204 associated with the vehicle 104 can be an open door of the vehicle 104. However, this is meant for example illustration and discussion and is not intended to be limiting. The condition 204 can be various other types of conditions that may arise with the vehicle 104.

In some implementations, the computing device(s) 106 can identify the user(s) 202A-F based, at least in part, on a threshold distance 206 from the vehicle 104. For instance, the vehicle 104 may be located in the position shown in FIG. 2 with its door open, and thus, unwilling to move. The computing device(s) 106 can determine a respective location of each of the user(s) 202A-F based, at least in part, on the location data 136 associated with the one or more user(s) 202A-F of the service. The computing device(s) 106 can compare the respective location of each of the one or more user(s) 202A-F of the service to the threshold distance 206. This can allow the computing device(s) 106 to determine which users are within proximity of the vehicle 104. Users that fall within the threshold distance 206 can be identified as potentially available to address the vehicle condition.

Additionally, or alternatively, the computing device(s) 106 can identify one or more user(s) based, at least in part, on a number of other criteria. For instance, the computing device(s) 106 can identify user(s) based, at least in part, on a user rating associated with each of the user(s). The user rating can be indicative of the user's behavior when interacting with the service provider, its employees, contractors, vehicles, etc. to use the associated services. The computing device(s) 106 can identify the user(s) such that only user's with a particular rating level (e.g., above a certain rating threshold, high ratings, super users) are identified to potentially address the condition 204 associated with the vehicle 104.

In some implementations, the computing device(s) 106 can identify one or more user(s) of the service based, at least in part, on the particular location of the vehicle 104. For instance, the vehicle 104 (e.g., with its door open) can be located on a school campus. The computing device(s) 106 can identify one or more user(s) of the service that are students (e.g., as indicated in a user profile) to potentially address the condition 204 associated with the vehicle 104. In this way, the computing device(s) 106 can identify users (e.g., students) that are more likely to be located in an area and/or entity around the vehicle 104.

In some implementations, the computing device(s) 106 can identify the one or more user(s) of the service based, at least in part, on a user's willingness to provide help to an autonomous vehicle 104. For instance, to become a user of the service (e.g., from the service provider), an individual may need to create a profile and/or account. The profile and/or account can include a variety of information about the user. For example, the profile and/or account can include a portion that allows the user to indicate whether the user is willing to provide assistance to an autonomous vehicle (e.g., to address a condition). The computing device(s) 106 can identify one or more user(s) of the service that have indicated a willingness to provide assistance. Additionally, or alternatively, the service provider may track (e.g., via a computing device) which users have previously addressed conditions associated with an autonomous vehicle. Thus, in some implementations, the computing device(s) 106 can identify one or more user(s) based, at least in part, on the user's history of addressing conditions associated with a vehicle.

The user(s) 202A-F identified by the computing device(s) 106 can have various statuses with respect to the service provided by the service provider. In some implementations, one or more of the user(s) (e.g., 202A-E) may have submitted a service request (e.g., for transportation services). Such users can be included in a service queue, as further described herein. In some implementations, one or more of the user(s) may not have submitted a service request but may still be users of the service (e.g., users that have downloaded a software application associated with the service provider). Additionally, or alternatively, one or more of the user(s) (e.g., 202F) may be a recent user of the vehicle 104 and/or may be associated with the condition 204 of the vehicle 104 (e.g., a user that left open the door).

The computing device(s) 106 can be configured to select at least one of the identified user(s) 202A-F to address the condition 204 associated with the vehicle 104. The selected user 202E can be a user of at least one of the transportation service, the courier service, the delivery service (and/or other service) provided by the vehicle 104. For example, the computing device(s) 106 can be configured to determine a selected user 202E of the one or more user(s) 202A-F to address the condition 204 associated with the vehicle 104 based, at least in part, on or more parameter(s) 208.

A user can be selected to address the condition 204 based, at least in part, on parameter(s) that help increase the likelihood that the user will alleviate the vehicle condition 204. For example, the computing device(s) 106 can determine a selected user 202E to address the condition 204 associated with the vehicle 104 based, at least in part, on the location of the user 202E. A user that is located closer to the vehicle 104 may be more willing to address the condition 204 (and/or use the vehicle 104 for its services).

Additionally, or alternatively, the computing device(s) 106 can select a user 202E based, at least in part, on the vehicle's position 210 (e.g., orientation, heading). In this way, the computing device(s) 106 can increase user convenience (and likelihood of cooperation) by pairing a user 202E to a vehicle that is already oriented to travel in the direction of the user's desired destination. For example, the user 202E may have submitted a service request that requests transportation to a destination that is located in the direction of the vehicle heading 212.

Moreover, the computing device(s) 106 can select a user based, at least in part, on user ratings associated with the service. For example, the computing device(s) 106 can examine ratings that indicate the behavior of the user 202E while using the service of the service provider. This can allow the computing device(s) 106 to select a user 202E with a higher behavioral rating, which may be indicative of a higher likelihood that the user 202E will address the condition 204 associated with the vehicle 104 (e.g., the open door).

The computing device(s) 106 can also, or alternatively, select a user 202E to address the condition 204 of the vehicle 104 based, at least in part, on the criteria used to initially identify the subset of users 202A-F that may be available to potentially address the condition 204. For instance, the computing device(s) 106 can identify one or more user(s) within a threshold distance 206 of the vehicle 104 and, then, select a user that has indicated a willingness to address and/or has history of addressing vehicle conditions.

In some implementations, the computing device(s) 106 can be configured to pair the selected user 202E with the vehicle 104 for a service request by adjusting a service queue. For example, FIGS. 3A-B depict an example service queue 300 according to example embodiments of the present disclosure. The queue 300 can include a data structure which can be stored in a medium such as a cache and/or other memory resource. The queue 300 can be an aggregation of data items, each of which are based on and/or otherwise correspond to a service request. A selection process can be associated with the queue in order to pair the service requests of the queue with a vehicle (e.g., 104) which can provide the requested service.

The computing device(s) 106 can adjust the queue 300 associated with the vehicle 104 to increase a priority of the selected user 202E for use of the vehicle 104 for the service provided by the vehicle 104. By way of example, user(s) 202A-E can submit service requests to the service provider for transportation. Each service request of the user(s) 202A-E can be placed into the queue 300, for example, in the order the service requests are received by the service provider. As shown in FIG. 3A, such a process may place a service request by user 202E in the queue 300 after the service requests by user(s) 202A-D. The computing device(s) 106 can, however, adjust the queue 300 such that the user 202E that was selected to address the condition 204 of the vehicle 104 is given priority for service provided by the vehicle 104, as shown in FIG. 3B. In this way, the selected user 202E can be paired with the vehicle 104. This type of queue adjustment can be performed after the user 202E is selected to address the vehicle condition 204 and/or after the user 202E confirms that he/she will address the vehicle condition, as described herein. In some implementations, even if the user 202E has not made a service request, the computing device(s) 106 can place the user 202E in the queue to help pair that user with the vehicle 104

Returning to FIG. 1, the computing device(s) 106 can be configured to provide, to the user 202E, a communication 138 indicative of a request that the user 202E address the condition 204 associated with the vehicle 104. For instance, the computing device(s) 106 can provide the communication 138 indicative of the request that the selected user 202E address the condition 204 associated with the vehicle 104 to a user device 140 associated with the selected user 202E. The selected user 202E can be registered with the service provider via a software application 142. The communication 138 can be provided to the user device 140 associated with the selected user 202E via the software application 142. For example, the communication 138 (e.g., a textual message) can be provided to a user's mobile phone and can be displayed via a user interface associated with the software application 142. The communication 138 can request that the user 202E walk to the vehicle 104 and close the vehicle door. Moreover, the communication 138 can indicate that the user 202E can also use the vehicle 104 for the user's service request (e.g., to transport the user to a destination location).

To encourage the user 202E to meet the request, the communication 138 can include an incentive 144 to the user 202E to address the condition 204 associated with the vehicle 104. For example, the communication 138 can be indicative of a monetary discount, credit, gift card, etc. for the user 202E when using the services provided by the service provider (e.g., a 10% discount on the user's next courier service). In some implementations, the incentive 144 can include an increase in the user rating 146 associated with the user 202E. In some implementations, the incentive 144 can include a service upgrade (e.g., a free upgrade to a more luxurious vehicle, faster courier).

The selected user 202E can confirm or deny the request to address the condition 204 associated with the vehicle 104. For instance, the user 202E can confirm the request via a user interface of the software application 142. The user device 140 can send data 150 indicative of the confirmation to the computing device(s) 106. The computing device(s) 106 can receive the data 150 indicative of the confirmation that the selected user 202E will address the condition 204. The computing device(s) 106 can pair the selected user 202E with the vehicle 104 and provide the user 202E with the incentive 144. The user 202E can travel (e.g., walk) to the vehicle 104 and address the condition 204 (e.g., by closing the door) and, if requested, can use the vehicle 104 for its service (e.g., to transport the user).

In the event that the user 202E denies the request, the computing device(s) 106 can select a different user to address the condition 204 associated with the vehicle 104. For instance, the computing device(s) 106 can receive data 152 indicative of a denial that the selected user 202E will address the condition 204. The computing device(s) can determine a different user (e.g., 202A) to address the condition 204 associated with the vehicle 104. The different user can be a user previously identified in the subset of user(s) 202A-F or another user. The computing device(s) 106 can provide a second communication 154 to the different user (e.g., 202A) via a user device 141 associated with the different user. The second communication 154 can include a request that the different user address the condition 204 associated with the vehicle 104. The computing device(s) 106 can repeat this process until a user of the services confirms that he/she will address the vehicle condition (e.g., close the vehicle door).

Figure 4:
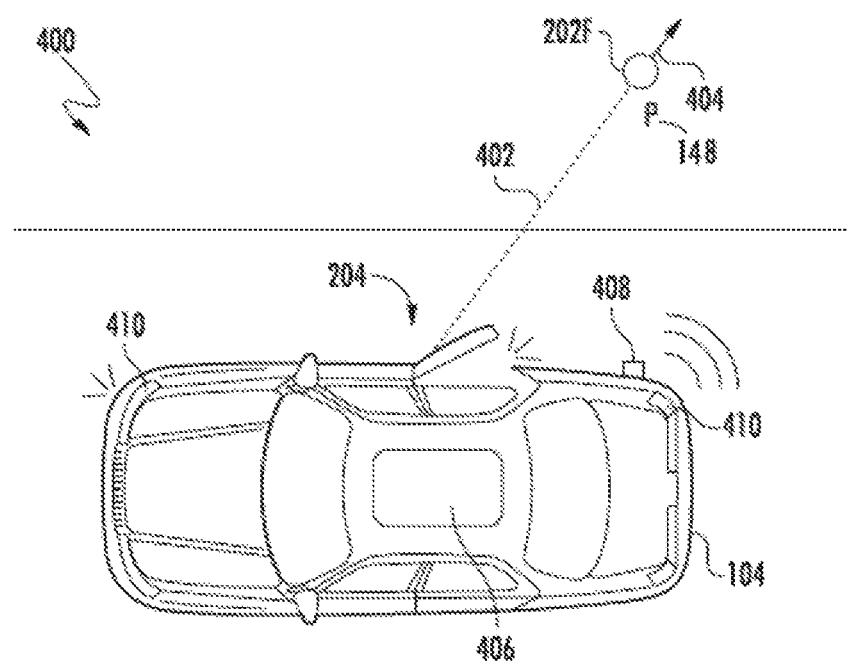
FIG. 4 illustrates the identification of a recent user of a vehicle according to example embodiments of the present disclosure.

In some implementations, the computing device(s) 106 can identify a recent user that caused the condition 204 associated with the vehicle. FIG. 4 illustrates the identification 400 of a recent user 202F according to example embodiments of the present disclosure. The recent user 202F can be the user (e.g., 127) that was provided the notification 128 to avoid the condition 204. One or more image capture device(s) of the vehicle 104 can be used to identify the distance 402 (e.g., from the vehicle 104) and/or velocity 404 of the user 202F. For example, the recent user 202F can be identified based, at least in part, on a LIDAR system 406 associated with the vehicle 104. The vehicle computing system 108 can send data associated with the recent user 202F (e.g., distance 402, velocity 404) to the computing device(s) 106, after the user exists the vehicle 104.

The computing device(s) 106 can receive the data associated with the recent user 202F. The computing device(s) 106 can compare such data to one or more thresholds (e.g., distance, velocity thresholds) to determine whether to communicate with the recent user 202F to address the vehicle condition 204 (e.g., the open door). For instance, if the recent user's distance and/or velocity has not exceeded the distance and/or velocity thresholds, the computing device(s) 106 can provide a communication (e.g., email, textual message, voice call, pre-recorded voice call, machine-generate voice call) to a user device associated with the recent user 202F. The communication can request that the recent user 202F address the condition 204 associated with the vehicle 104 (e.g., return to the vehicle to close the door). In some implementations, the computing device(s) 106 can send a signal instructing the vehicle computing system 108 to provide a communication to the recent user 202F. For example, the communication can be provided via at least one of an audio output device 408 (e.g., speaker) of the vehicle 104 and a visual output device 410 (e.g., headlight, tail light, puddle light) of the vehicle 104.

In some implementations, the computing device(s) 106 can provide a communication to the recent user 202F, even in the event that the distance 402 and/or velocity vector 404 of the recent user 202F exceed one or more threshold(s) (e.g., distance, velocity thresholds). For instance, the computing device(s) 106 can send a communication indicating the condition 204 associated with the vehicle 104. In some implementations, the communication can be provided via a user interface associated with a software application (e.g., within a user interface where the user rates the service).

In some implementations, the service provider can penalize the recent user 202F. The computing device(s) 106 can identify the recent user 202F of the vehicle 104 that is associated with the condition of the vehicle. The computing device(s) 106 can apply a penalty 148 associated with the service to the recent user 202F. By way of example, the computing device(s) 106 can lower a rating associated with the recent user and/or apply a monetary penalty to the user's profile, account, etc.

Figure 5:
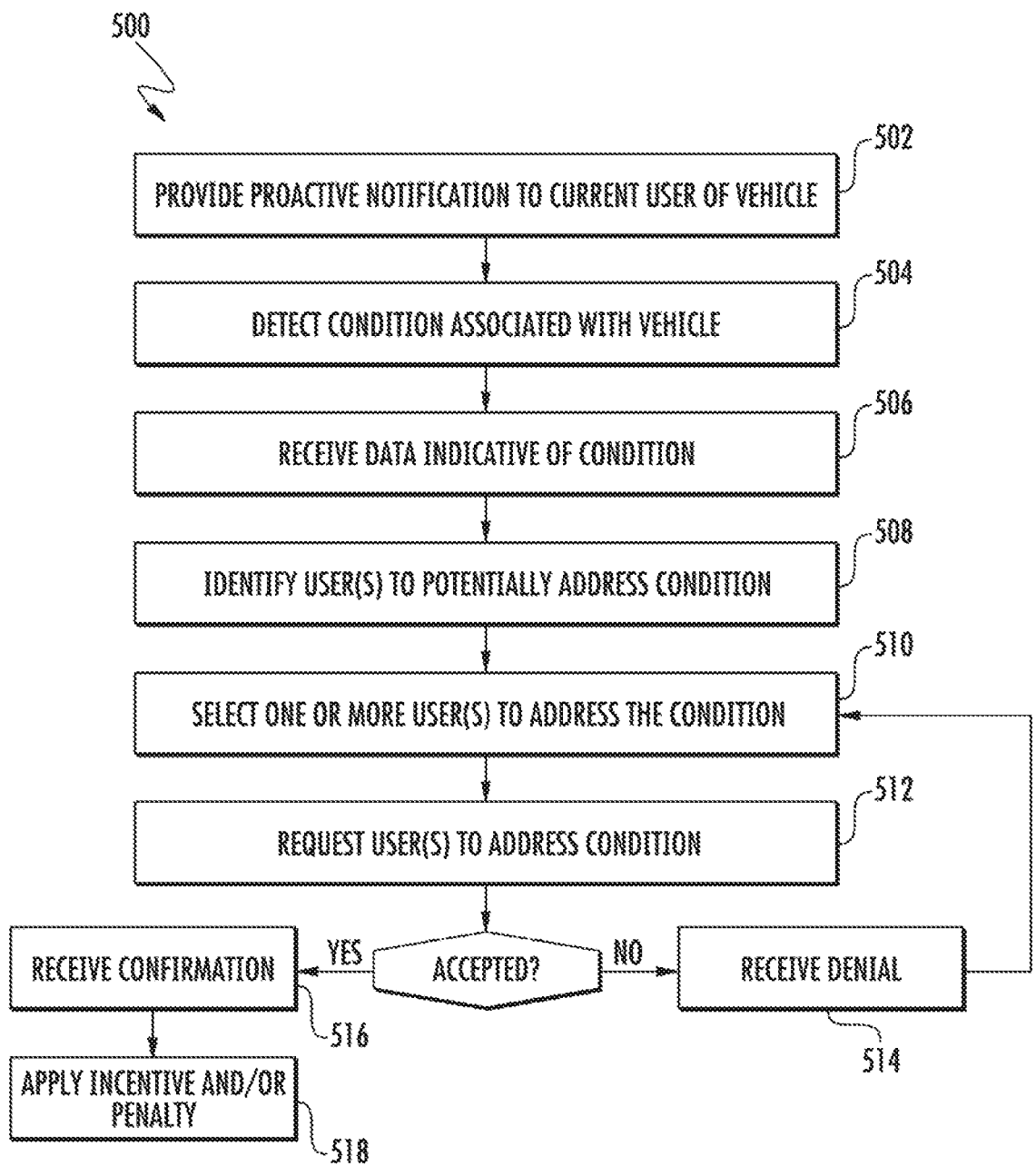
FIG. 5 depicts a flow diagram of an example method of addressing a vehicle condition according to example embodiments of the present disclosure.

FIG. 5 depicts a flow diagram of an example method 500 of addressing a vehicle condition according to example embodiments of the present disclosure. One or more portion(s) of method 500 can be implemented by one or more computing device(s) such as, for example, the computing device(s) 106 shown in FIGS. 1 and 6. Moreover, one or more portion(s) of the method 500 can be implemented as an algorithm on the hardware components of the device(s) described herein (e.g., as in FIGS. 1 and 6) to, for example, control access to a vehicle. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, and/or modified in various ways without deviating from the scope of the present disclosure.

At (502), the method 500 can include providing a proactive notification to a current user of the vehicle. For instance, the computing device(s) 106 of the operations computing system 102 can provide a notification 128 to a current user 127 (e.g., current rider) of the vehicle 104. To do so, the computing device(s) 106 can provide a communication (e.g., textual message, audio message, vibration) to a user device 130 associated with the current user 127. The communication can notify the current user 127 to avoid causing a condition 204 associated with the vehicle 104 (e.g., leaving the door open). In some implementations, the computing device(s) 106 can instruct the vehicle computing system 108 to provide the notification 128 to the current user 127. For example, the vehicle computing system 108 can provide a message (e.g., "Please Close All Vehicle Doors Upon Exit") via the human-machine interface 118 and/or the output device(s) 116. Additionally, or alternatively, a human operator associated with the service provider can connect to the vehicle computing system 108 and provide the notification 128 to the current user 126 (e.g., via a speaker system, on-board display device).

At (504), the method 500 can include detecting a condition associated with the vehicle. For example, the vehicle computing system 108 can detect a condition 204 associated with the vehicle 104. The condition 204 can include an open door, a door not opened due to a malfunction and/or a passenger sleeping in the vehicle 104, interior lights illuminated, etc. The vehicle computing system 108 can detect the condition 204 via one or more data acquisition system(s) 110 (e.g., sensor(s) 126, image capture device(s) 124), as described herein.

At (506), the method 500 can include receiving data indicative of the condition associated with the vehicle. For instance, the vehicle computing system 108 can send data 134 indicative of the condition 204 to the computing device(s) 106 of the operations computing system 102. The computing device(s) 106 can receive data 134 indicative of a condition 204 associated with an autonomous vehicle 104. As indicated above, the vehicle 104 can be associated with a service provider that provides a service to a plurality of users 200 of the service. By way of example, a user of the service can leave a vehicle door open when using the autonomous vehicle 104 for a service (e.g., transportation service, courier service, delivery service). The computing device(s) 106 can receive data indicative of the open door of the vehicle 104 (e.g., from the vehicle computing system 108).

At (508), the method 500 can include identifying one or more user(s) to potentially address the condition associated with the vehicle. For instance, the computing device(s) 106 can identify at least a subset 202A-F of the plurality of users 200 of the service based, at least in part, on a respective location associated with each of the users of the subset of users 202A-F and a location of the vehicle 104. For example, the computing device(s) 106 can identify a subset of users 202A-F that are within proximity of the vehicle 104. The subset of users 202A-F of the service can be, for example, registered with the service provider via a software application 142. The computing device(s) 106 can determine the respective location of each user of the subset of users 202A-F of the service based, at least in part, on location data 136 associated with each user of the subset of users 202A-F. The location data 136 can be provided to the service provider when, for instance, the software application 142 is running on a user device associated with the user. The computing device(s) 106 can compare the respective location of a user of the subset of users 202A-F to a threshold distance 206. Additionally, and/or alternatively, the computing device(s) 106 can identify the subset of users 202A-F based, at least in part, on other criteria (e.g., user rating, type of location), as described herein.

At (510), the method 500 can include selecting one or more user(s) to address the condition associated with the vehicle. For instance, the computing device(s) 106 can determine a selected user 202E from the subset of users 202A-F of the service to address the condition 204 associated with the vehicle 104 based, at least in part, on one or more parameter(s) 208. The one or more parameter(s) 208 can include at least one of the respective location of the selected user 202E, a position 210 of the vehicle 104, and one or more user rating(s) associated with the service (e.g., ratings of the selected user, other users). The computing device(s) 106 can determine the selected user 202E in a manner that increases the likelihood that the selected user will address the condition 204 associated with the vehicle 104. By way of example, a user 202E that is closer to the vehicle 104, that will be travelling in the direction in which the vehicle is oriented, and/or that has a high user rating (e.g., indicating highly rated user behavior) may be more likely to close the door of the vehicle 104, open a malfunctioned door for a passenger, etc. In some implementations, the computing device(s) can select the highest rated user of the subset of users 202A-F. To help pair the selected user to the vehicle 104, the computing device(s) 106 can adjust a queue 300 associated with the vehicle 104 to increase a priority of the selected user 202E for use of the vehicle 104 for a service, as described herein.

At (512), the method 500 can include requesting one or more user(s) to address the condition associated with the vehicle. For instance, the computing device(s) 106 can provide a communication 138 to the selected user 202E. The communication 138 can include a request that the selected user 202E address the condition 204 associated with the vehicle 104. The communication 138 can be provided to a user device 140 associated with the selected user 202E, for example, via a software application 142 (e.g., associated with the service provider). The computing device(s) 106 can send a textual message, email, voice message, etc. to the selected user 202E requesting that the selected user 202E travel to the vehicle 104 to address the condition 204 (e.g., close the door). In some implementations, the communication can include an incentive 144 for addressing the condition 204, as described herein.

In some implementations, the communication 138 can be provided to the selected user via the one or more output device(s) 116 of the vehicle 104. For example, as indicated above, a recent user 202F can be identified by the vehicle computing system 108 (and/or the computing device(s) 106). To obtain the recent user's attention with respect to the condition 204 associated with the vehicle 104, one or more audible output(s) (e.g., alarms, sounds, voice messages) and/or visual output(s) (e.g., flashing lights) can be provided to the recent user 202F via one or more output device(s) 116 of the vehicle 104. In another example, a recent user 202F of the vehicle 104 (e.g., for transportation services) can fall asleep in the interior of the vehicle 104. As such, the vehicle computing system 108 can detect that a door of the vehicle 104 has not opened (e.g., beyond a time threshold 132) and/or that the user 202F remains in the vehicle 104. The computing device(s) 106 can send a signal to the vehicle computing system 108 to provide a communication to the sleeping user via the vehicle's output device(s) 116 (e.g., horn, speakers, tele-assist) to wake the sleeping user to exit the vehicle 104.

In some implementations, the computing device(s) 106 can determine more than one selected users to address the condition 204 associated with the vehicle 104. For instance, the computing device(s) 106 can select one or more additional user(s) 202A-D of the subset of users of the service to address the condition 204 associated with the vehicle 104. In such a case, the computing device(s) 106 can provide, to each of the respective additional users 202A-D, a communication indicative of a request for the respective additional user to address the condition 204 associated with the vehicle 104. This can increase the likelihood that the condition 204 associated with the vehicle 104 (e.g., an open vehicle door) will be addressed.

At (514), the method 500 can include receiving a denial to address the condition. For instance, the computing device(s) 106 can receive data 152 indicative of a denial that the selected user 202E will address the condition 104. This can arise when the user 202E is unwilling and/or unable to meet the request and/or has ignored the request (e.g., without actively confirming or denying within a time threshold). The computing device(s) 106 can determine a different user (e.g., 202A) to address the condition 204 associated with the vehicle 104. The computing device(s) 106 can provide a second communication 154 to the different user (e.g., 202A). The second communication 154 can include a request that the different user (e.g., 202A) address the condition 204 associated with the vehicle 104. If needed, the computing device(s) 106 can repeat one or more portion(s) of the method 500 until a user of the service confirms that he/she will address the condition 204 associated with the vehicle 104. In some implementations, the computing device(s) 106 can increase the amount, value, impact, etc. of the incentive 144 to further increase the likelihood that a user will confirm the request to address the condition 204.

At (516), the method 500 can include receiving a confirmation to address the condition. For example, the selected user 202E can confirm that he/she will address the condition 204 (e.g., via a user interface displayed on a user device, a textual message, a voice confirmation). The computing device(s) 106 can receive data 150 indicative of a confirmation that the selected user 202E will address the condition 204. Accordingly, the selected user 202E can walk to the vehicle 104, address the condition 204 (e.g., by closing the door, opening the door) and, if requested, can use the vehicle 104 for its service (e.g., to courier an item for the user). The vehicle computing system 108 can provide, to the computing device(s) 106, data indicating that the condition 204 has been addressed. The computing device(s) 106 can receive the data indicating that the condition 204 has been addressed. In some implementations, the computing device(s) 106 can cause a notation, marker, reference, and/or other identifier to be added to the selected user's account, profile, history, etc. identifying that the user addressed the condition 204 associated with the vehicle 104.

At (518), the method 500 can include applying an incentive and/or penalty associated with the service. For instance, the computing device(s) 106 can apply an incentive 144 for the user that addressed the condition 204 associated with the vehicle 104. The incentive 144 can include, for example, increasing the user rating 146, providing the user with a monetary discount (e.g., credit, coupon, % reduction), etc. To apply the incentive, the computing device(s) 106 can apply the incentive 144 to the user rating 146, the user's profile, the user's account, send to the user's email/home, etc.

In some implementations, the computing device(s) 106 can track the number, type, time, location, and/or other characteristics of the conditions addressed by a user. Once the user has exceeded a certain number and/or score (e.g., that takes into account characteristics associated with addressing conditions), the computing device(s) 106 can provide the user with a reward. The reward can include, for example, a free use of the services, a designation as a "super user," etc. The computing device(s) 106 can apply the reward to the user's profile, the user's account, the user rating 146, send it to the user's email address, etc.

Additionally, or alternatively, the computing device(s) 106 can apply a penalty 148 associated with the service to the recent user 202F that is associated with the condition 204 of the vehicle 104 (e.g., that left open the door). As indicated herein, the penalty 148 can include a decrease in the user's rating, a monetary penalty (e.g., fine, service cost increase), a notation in the user's profile, account, history, etc. and/or another type of penalty. In this way, the computing device(s) 106 can aim to decrease the likelihood of such a user causing the condition in the future.

Figure 6:
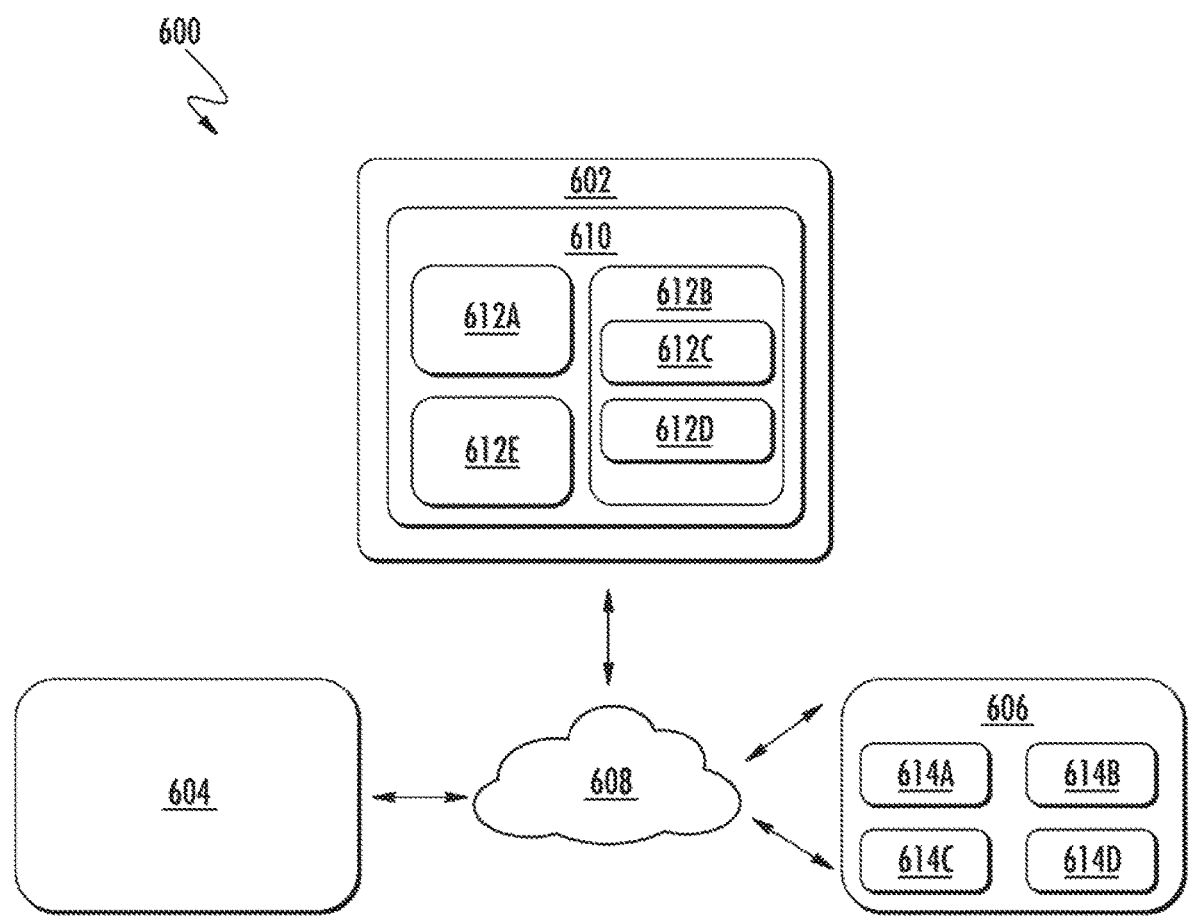
FIG. 6 depicts an example system according to example embodiments of the present disclosure.

FIG. 6 depicts an example system 600 according to example embodiments of the present disclosure. The system 600 can include an operations computing system 602, a vehicle computing system 604, and one or more user device(s) 606. The operations computing system 602, vehicle computing system 604, and user device(s) 606 can correspond to the operations computing system, vehicle computing system, and user device(s) shown in FIG. 1 and described herein. The operations computing system 602, vehicle computing system 604, and user device(s) 606 can be configured to communicate via one or more network(s) 608.

The operations computing system 602 can include one or more computing device(s) 610 (e.g., that correspond to the computing device(s) 106 as described herein). The computing device(s) 610 can include one or more processor(s) 612A. The one or more processor(s) 612A can be any suitable processing device such as a microprocessor, microcontroller, integrated circuit, an application specific integrated circuit (ASIC), a digital signal processor (DSP), a field-programmable gate array (FPGA), logic device, one or more central processing units (CPUs), processing units performing other specialized calculations, etc. The processor(s) can be a single processor or a plurality of processors that are operatively and/or selectively connected.

The computing device(s) 610 can also include one or more memory device(s) 612B. The memory device(s) 612B can include one or more non-transitory computer-readable storage media, such as RAM, ROM, EEPROM, EPROM, flash memory devices, magnetic disks, etc., and/or combinations thereof. The memory device(s) 612B can store information that can be accessed by the one or more processor(s) 612A. For instance, the memory device(s) 612B can include computer-readable instructions 612C that can be executed by the one or more processor(s) 612A. The instructions 612C can be software written in any suitable programming language or can be implemented in hardware. Additionally, and/or alternatively, the instructions 612C can be executed in logically and/or virtually separate threads on processor(s) 612A. The instructions 612C can be any set of instructions that when executed by the one or more processor(s) 612A cause the one or more processor(s) 612A to perform operations.

For example, the memory device(s) 612B can store instructions that when executed by the one or more processor(s) 612A cause the one or more processor(s) 612A to perform operations such as the operations for addressing a vehicle condition (e.g., one or more portion(s) of method 500), operations for monitoring the position of a vehicle (e.g., 104) and/or a user device (e.g., 140), any of the operations and functions of the computing device(s) 106 and/or for which the computing device(s) 106 are configured, and/or any other operations or functions for addressing a vehicle condition, as described herein.

The one or more memory device(s) 612B can store data 612D that can be retrieved, manipulated, created, and/or stored by the one or more processor(s) 612A. The data 612D can include, for instance, data associated with the vehicle 104, data acquired by the data acquisition systems 110, map data, data associated with a vehicle condition, data associated with incentives and/or penalties, data associated with a user (e.g., location data, profile, account, history), and/or other data or information. The data 612D can be stored in one or more database(s). The one or more database(s) can be split up so that they are located in multiple locales.

The computing device(s) 610 can also include a communication interface 612E used to communicate with one or more other component(s) of the system 600 (e.g., vehicle computing system 604, user device(s) 606). The interface 612E can include any suitable components for interfacing with one or more network(s), including for example, transmitters, receivers, ports, controllers, antennas, or other suitable hardware and/or software.

The user device(s) 606 can be various types of computing devices. For example, the user device(s) 606 can include a phone, a smart phone, a tablet, a personal digital assistant (PDA), a laptop computer, a desktop computer, a computerized watch (e.g., a smart watch), computerized eyewear, computerized headwear, other types of wearable computing devices, a gaming system, a media player, an e-book reader, and/or other types of mobile and/or non-mobile computing device.

The user device(s) 606 can include one or more input device(s) 614A and/or one or more output device(s) 614B. The input device(s) 614A can include, for example, devices for receiving information from a user, such as a touch screen, touch pad, mouse, data entry keys, speakers, a microphone suitable for voice recognition, etc. The input device(s) 614A can be used, for example, by a user to confirm and/or deny a request to address a vehicle condition. The output device(s) 614B can include devices for providing content to the user. For example, the output device(s) 614B can include a display device (e.g., display screen, CRT, LCD), which can include hardware for displaying a communication to a user. Additionally, and/or alternatively, the output device(s) 614B can include an audio output device (e.g., speaker) and/or device for providing haptic feedback (e.g., vibration).

The user device(s) 606 can include a positioning system 614C for determining and/or reporting a location of the user device 606. For example, the positioning system 614C can determine actual and/or relative position by using a satellite navigation positioning system (e.g. a GPS system, a Galileo positioning system, the Global Navigation Satellite System (GNSS), the BeiDou Satellite Navigation and Positioning system), an inertial navigation system, a dead reckoning system, based on IP address, by using triangulation and/or proximity to cellular towers or WiFi hotspots, beacons, and the like and/or other suitable techniques for determining position. As described herein, the user device(s) 606 can provide data indicative of device location (e.g., raw location reports) to the service provider (e.g., a computing device associated therewith).

The user device(s) 606 can include a communication interface 614D used to communicate with one or more other component(s) of the system 600 (e.g., operations computing system 602, vehicle computing system 604). The interface 614D can include any suitable components for interfacing with one or more network(s), including for example, transmitters, receivers, ports, controllers, antennas, or other suitable hardware and/or software.

The network(s) 608 can be any type of communications network, such as a local area network (e.g. intranet), wide area network (e.g. Internet), cellular network, any of the networks described herein, and/or or some combination thereof. The network(s) 608 can also include a direct connection between one or more components of the system 600. In general, communication between one or more component(s) of the system 600 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein can be implemented using a single server or multiple servers working in combination. Databases and applications can be implemented on a single system or distributed across multiple systems. Distributed components can operate sequentially or in parallel.

Furthermore, computing tasks discussed herein as being performed at computing device(s) remote from the vehicle (e.g., the operations computing system and its associated computing device(s)) can instead be performed at the vehicle (e.g., via the vehicle computing system). For example, the vehicle computing system can be configured to identify and communicate with users in the manner described above, without communicating with the operations computing system. Likewise, computing tasks discussed herein as being performed at the vehicle (e.g., via the vehicle computing system) can instead be performed by computing devices remote from the vehicle (e.g., the operations computing system and its associated computing device(s)). Such configurations can be implemented without deviating from the scope of the present disclosure.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of addressing a vehicle condition, comprising:

receiving, by a computing system that comprises one or more computing devices, data indicative of a condition associated with an autonomous vehicle, wherein the autonomous vehicle is configured to provide a vehicle service through a service provider that coordinates a provision of the vehicle service to a plurality of users of the service provider;

determining, by the computing system, a user of the plurality of users to address the condition associated with the autonomous vehicle based at least in part on one or more parameters, wherein the user is outside of the autonomous vehicle and the user is associated with a user device that stores a software application that is configured to communicate with the service provider; and providing, by the computing system to the user device associated with the user, a communication comprising a request that the user address the condition associated with the autonomous vehicle;

receiving, by the computing system, data indicative of a confirmation that the user will address the condition; and pairing the autonomous vehicle with one or more users of the plurality of users of the service provider for a vehicle service based, at least in part, on the confirmation.

2. The computer-implemented method of claim 1, wherein the one or more parameters comprise location data of the user device and location data of the autonomous vehicle, and wherein determining the user to address the condition associated with the autonomous vehicle comprises:

determining, by the computing system, a location of the user and a location of the autonomous vehicle based at least in part on the location data of the user device and the location data of the autonomous vehicle; and determining, by the computing system, the user to address the condition associated with the autonomous vehicle based at least in part on the location of the user and the location of the autonomous vehicle.

3. The computer-implemented method of claim 1, further comprising:
receiving, by the computing system, data indicative of a denial that the user will address the condition;
determining, by the computing system, a different user to address the condition associated with the autonomous vehicle; and
providing, by the computing system, a communication to a user device associated with the different user, wherein the communication comprises a request that the different user address the condition associated with the autonomous vehicle.

4. The computer-implemented method of claim 1, wherein the user is included among one or more users that are within a threshold distance of the autonomous vehicle.

5. The computer-implemented method of claim 1, wherein the condition associated with the autonomous vehicle is an open door of the autonomous vehicle, and wherein the communication requests that the user close the open door of the autonomous vehicle.

6. The computer-implemented method of claim 1, wherein the one or more parameters comprise a user rating associated with the user, wherein the user rating is indicative of a user's behavior while using the vehicle service of the service provider.

7. The computer-implemented method of claim 1, wherein the user is associated with a pending request for the vehicle service or has previously requested the vehicle service.

8. The computer-implemented method of claim 1, wherein the user is a recent user of the autonomous vehicle for the vehicle service.

9. The computer-implemented method of claim 1, wherein the method further comprises:
determining, by the computing system, one or more additional users to address the condition associated with the autonomous vehicle; and
providing, to each of the respective additional users, a communication indicative of a request for the respective additional user to address the condition associated with the autonomous vehicle.

10. A computing system for addressing a vehicle condition, the system comprising:
one or more processors; and
one or more memory devices, the one or more memory devices storing instructions that when executed by the one or more processors cause the one or more processors to perform operations, the operations comprising:
receiving data indicative of a condition associated with an autonomous vehicle, wherein the autonomous vehicle is configured to provide a vehicle service through a service provider that coordinates a provision of the vehicle service to a plurality of users of the vehicle service, wherein the condition at least temporarily prevents the autonomous vehicle from autonomously travelling;
determining a selected user from the plurality of users to address the condition associated with the vehicle based at least in part on one or more parameters, wherein the selected user is outside of the autonomous vehicle and is associated with a pending request for the vehicle service;
receiving data indicative of a confirmation from a user device associated with the selected user, the data indicative of the confirmation indicating that the selected user will address the condition;
pairing the autonomous vehicle with the selected user for the pending request for the vehicle service; and
providing, to the user device associated with the selected user, a communication indicating that the selected user is paired with the autonomous vehicle for the request for the vehicle service associated with the user.

11. The computing system of claim 10, wherein the operations further comprise:
confirming that the user has addressed the condition of the autonomous vehicle.

12. The computing system of claim 10, wherein the operations further comprise:
applying an incentive in response to confirming that the user has addressed the condition associated with the autonomous vehicle.

13. The computing system of claim 10, wherein the operations further comprise:
identifying a recent user of the autonomous vehicle, wherein the recent user is associated with the condition associated with the autonomous vehicle; and
applying, to the recent user, a penalty associated with the vehicle service.

14. The computing system of claim 10, wherein the operations further comprise:
providing a notification to a current user of the autonomous vehicle, the notification instructing the current user to avoid the condition associated with the autonomous vehicle.

15. One or more tangible, non-transitory computer-readable media storing computer-readable instructions that when executed by one or more processors cause the one or more processors to perform operations, the operations comprising:
receiving data indicative of a condition associated with an autonomous vehicle, wherein the autonomous vehicle is configured to provide a vehicle service through a service provider that coordinates a provision of the vehicle service to a to a plurality of users of the vehicle service, wherein the plurality of users comprise a current user of the autonomous vehicle,
wherein the condition is associated with a failure of the current user of the autonomous vehicle to exit the autonomous vehicle;
providing a communication to the current user via one or more output devices, wherein the communication indicates that the current user is to exit the autonomous vehicle;
determining a selected user of the plurality of users of the vehicle service to address the condition associated with the autonomous vehicle based at least in part on one or more parameters, wherein the selected user is outside of the autonomous vehicle;
receiving data indicative of a confirmation from a user device associated with the selected user, the data indicative of the confirmation indicating that the selected user will address the condition; and
pairing the autonomous vehicle with one or more of the plurality of users for a vehicle service based, at least in part, on the confirmation.

16. The one or more tangible, non-transitory computer-readable media of claim 15, wherein the current user is asleep within the autonomous vehicle.

17. The one or more tangible, non-transitory computer-readable media of claim 15, wherein the condition is identified after the autonomous vehicle transports the current user to a destination.

18. The one or more tangible, non-transitory computer-readable media of claim 15, wherein the one or more output devices comprise at least one of an audio output device or a visual output device.

19. The one or more tangible, non-transitory computer-readable media of claim 15, wherein the condition is detected based at least in part on a determination that a door of the autonomous vehicle has not opened.

* * * * *